US009777972B2

(12) United States Patent
Da Conceição Rosa (10) Patent No.: US 9,777,972 B2
(45) Date of Patent: Oct. 3, 2017

(54) HEAT SINK FOR A LINEAR MOTOR

(71) Applicant: ETEL S.A., Môtiers (CH)

(72) Inventor: André-Rafael Da Conceição Rosa, La Chaux-de-Fonds (CH)

(73) Assignee: ETEL S.A., Môtiers (CH)

( * ) Notice: Subject to any disclaimer, the term of this patent is extended or adjusted under 35 U.S.C. 154(b) by 5 days.

(21) Appl. No.: 14/894,175

(22) PCT Filed: Apr. 3, 2014

(86) PCT No.: PCT/EP2014/056705
§ 371 (c)(1),
(2) Date: Nov. 25, 2015

(87) PCT Pub. No.: WO2014/191129
PCT Pub. Date: Dec. 4, 2014

(65) Prior Publication Data
US 2016/0102928 A1   Apr. 14, 2016

(30) Foreign Application Priority Data

May 27, 2013   (EP) ...................................... 13169363

(51) Int. Cl.
*F28F 13/06*   (2006.01)
*F28D 15/00*   (2006.01)
(Continued)

(52) U.S. Cl.
CPC .............. *F28F 13/06* (2013.01); *F28D 15/00* (2013.01); *H02K 3/24* (2013.01); *H02K 9/22* (2013.01);
(Continued)

(58) Field of Classification Search
CPC   H02K 9/19; H02K 9/22; H02K 41/02; H02K 3/24; H02K 3/47; H02K 7/14; H02K 41/031; F28F 13/06; F28D 15/00
(Continued)

(56) References Cited

U.S. PATENT DOCUMENTS 5,723,917 A  *  3/1998  Chitayat ............. G03F 7/70758
                                                      310/12.01
5,775,402 A  *  7/1998  Sachs ..................... B22C 9/065
                                                      164/4.1
(Continued)

FOREIGN PATENT DOCUMENTS

CN        201854167        6/2011
EP        1 544 988        6/2005
(Continued)

OTHER PUBLICATIONS

International Search Report, dated May 27, 2014, issued in corresponding International Application No. PCT/EP2014/056705.

*Primary Examiner* — Quyen Leung
*Assistant Examiner* — Minki Chang
(74) *Attorney, Agent, or Firm* — Andrews Kurth Kenyon LLP (57) ABSTRACT

A heat sink for the primary part of a linear motor includes a coil system having at least one coil that is to be energized when the motor is in operation, the heat sink being provided for accommodating the coil system of the primary part and forming at least one duct, through which a coolant is flowing during the operation of the heat sink, and at least one intake as well as at least one outlet for the coolant. The heat sink is arranged as an integrally formed component, which has an interface for connecting an object to be moved with the aid of the primary part, the interface having a contact surface via which the object to be moved is able to be brought into contact with the heat sink, and which is arranged and (Continued)

provided for cooling both the coil system of the primary part and the contact surface, such that coolant supplied to the heat sink through an intake is used for cooling the coil system and the contact surface.

14 Claims, 6 Drawing Sheets

(51) Int. Cl.
    *H02K 9/19*      (2006.01)
    *H02K 9/22*      (2006.01)
    *H02K 41/02*     (2006.01)
    *H02K 3/24*      (2006.01)
    *H02K 41/03*     (2006.01)
    *H02K 3/47*      (2006.01)
    *H02K 7/14*      (2006.01)

(52) U.S. Cl.
    CPC ........... *H02K 41/02* (2013.01); *H02K 41/031* (2013.01); *H02K 3/47* (2013.01); *H02K 7/14* (2013.01)

(58) Field of Classification Search
    USPC .......... 310/12.29, 16, 52, 54, 58, 59, 64, 65
    See application file for complete search history.

(56) References Cited

U.S. PATENT DOCUMENTS

| | | | |
|---|---|---|---|
| 6,664,665 B2* | 12/2003 | Hsiao | H02K 41/03 310/12.14 |
| 7,057,313 B2 | 6/2006 | Buis et al. | |
| 7,205,687 B2* | 4/2007 | Wavre | H02K 1/20 310/12.29 |
| 9,325,222 B2* | 4/2016 | Shinohira | H02K 9/19 |
| 9,325,223 B2* | 4/2016 | Shinohira | H02K 9/19 |
| 2003/0141769 A1* | 7/2003 | Kubo | G03F 7/70758 310/12.06 |
| 2004/0070290 A1 | 4/2004 | Joung et al. | |
| 2006/0001322 A1* | 1/2006 | Binnard | H02K 41/03 310/12.06 |
| 2006/0017337 A1* | 1/2006 | Smith | H02K 11/046 310/68 D |
| 2006/0049700 A1 | 3/2006 | Moriyama | |
| 2006/0091732 A1 | 5/2006 | Onishi | |
| 2006/0175907 A1 | 8/2006 | Shikayama et al. | |
| 2007/0257563 A1* | 11/2007 | Huang | H02K 41/03 310/12.25 |
| 2011/0181130 A1* | 7/2011 | Yoshida | H02K 41/031 310/12.29 |
| 2012/0062866 A1* | 3/2012 | Binnard | H02K 9/22 355/72 |

FOREIGN PATENT DOCUMENTS

| | | |
|---|---|---|
| JP | 2004-304932 | 10/2004 |
| WO | 03/005538 | 1/2003 |

* cited by examiner

HEAT SINK FOR A LINEAR MOTOR

FIELD OF THE INVENTION

The present invention relates to a heat sink for the primary part of a linear motor and to a linear motor having such a heat sink.

BACKGROUND INFORMATION

Linear motors are increasingly used when highly precise and possibly also rapid positioning of objects is involved, such as a machine part of a machine tool, for example. Via a suitable interface the primary part of the linear motor may be connected directly to the machine part or other object to be moved. In contrast to a conventional rotating motor, there is no need of providing a gear unit connected between the linear motor and the object to be driven.

Particularly suitable for applications that require especially precise positioning are ironless linear motors, in which no iron core is allocated to the at least one coil provided on the primary part. In this manner, interfering cogging torques are avoidable. However, correspondingly higher coil currents are necessary in order to be able to generate forces of sufficient magnitude at the primary part of the linear motor even in the absence of an iron core. This in turn necessitates excellent cooling of the coil or coils (hereinafter also generally referred to as coil system).

In the case of an ironless linear motor, the heat sink can simultaneously be used for accommodating the coil system of the primary part. Such an ironless linear motor is described in U.S. Pat. No. 7,057,313, for example.

SUMMARY

Example embodiments of the present invention provide a heat sink that may achieve effective cooling at the lowest possible effort.

According to example embodiments of the present invention, a heat sink is formed by a single, integrally formed component, which is arranged both for cooling the at least one coil (coil system) of the primary part and for cooling an interface of the heat sink used for linking the object to be moved, in particular a contact surface of the interface (and thus the heat sink), via which the object to be moved by the primary part is to be placed against the heat sink according to the intended purpose. For this purpose the heat sink is arranged such that coolant, e.g., in the form of a cooling fluid which enters at an intake of the heat sink, is used both for cooling the at least one coil and the interface or contact surface. In other words, the heat sink defines a shared, unified coolant circuit both for the coils to be cooled and for the interface/contact surface to be cooled. No separate coolant for cooling the coil system on the one hand and the contact surface on the other is therefore used. Overall, the heat sink in particular may therefore have exactly one intake for the coolant and exactly one outlet for the coolant.

Because the object to be moved is to be linked to the heat sink (as component of the primary part of the linear motor) and the corresponding contact area of the heat sink is cooled, an undesired heat input (of engine heat) into the object to be moved can be avoided in a reliable manner.

Such a heat sink, which in particular may be provided in the shape of a plate (as a cooling plate), can be manufactured by 3D printing, for example, i.e., with the aid of a 3D printer which produces the heat sink from one or more fluid or powdery materials at certain measurements and shapes.

However, other methods for producing an integrally formed heat sink are possible as well, such as the continuous-metal connection, especially welding, of at least two plate components (plate halves), into which grooves have been introduced (e.g., machined) previously in order to form ducts for the coolant.

In other words, in this instance an integrally formed heat sink is a component that has been produced in a shaping process (without additional subsequent connection steps between individual components of the heat sink) or in which, at most, additional continuous-material connections (e.g., welding connections) are provided between components of the heat sink. The first alternative, in particular in the form of a heat sink produced by 3D printing, is considered especially advantageous. The components of a heat sink that constitute the integral component, are the components that accommodate the coolant and guide it within the heat sink, i.e., especially the outer walls of the heat sink and the ducts for the coolant formed in the heat sink.

The approach described herein provides cooling not only of the coil(s) of the primary part, but moreover also of the interface via which the primary part is linked to an object to be moved by the linear motor, in particular the corresponding contact area of the heat sink, using only one component, i.e., without any substantially greater outlay than would be required anyway for cooling only the coil system. Because of the additional cooling of the interface/contact area, an introduction of heat into the object to be moved, e.g., in the form of a machine part, is able to be avoided.

Titanium, which as a metal provides high thermal conductivity at a simultaneously relatively high specific resistance, the latter conteracting the generation of eddy currents in the heat sinks, is suitable as the material for the heat sink. Further suitable materials are, for example, noble steel or (electrically insulating, non-water-absorbing) ceramic materials, such as described in U.S. Pat. No. 7,057,313, for instance.

Not only are the coolant intake and the coolant outlet (e.g., in the form of an intake and outlet opening, for example) premolded on the heat sink in an integral fashion, but also the individually associated connection region, via which a supply line and a discharge line for the coolant are connectable.

In addition, fastening elements, via which the at least one coil of the primary part is able to be fixed in place on the heat sink, may be formed in one piece on the heat sink. For example, the fastening elements may be provided as detent elements, via which an individual coil brace can be latched to the heat sink, or also as fastening openings. By a defined attachment of the coil(s) on the heat sink, in particular while generating a certain contact pressure, a defined heat transition can be ensured between a coil to be cooled and the heat sink.

The heat sink together with the ducts formed therein may be arranged such that the coolant supplied to the heat sink initially cools the interface/contact surface, and then the coil(s) of the primary part. The coolant is guided along the coil(s) inside the ducts of the heat sink. The coolant is then removed via an outlet, without making further contact with the region (intake region) of the heat sink via which the coolant is initially provided in order to cool the interface/contact surface of the primary part (more precisely: the heat sink).

The heat sink may be arranged such that it has an intake region downstream from the coolant entry point, in which the coolant supplied via the intake flows in at the beginning.

The channels, via which the coolant is routed along the coil(s) of the primary part to be cooled, may branch off from this intake region. Furthermore, the intake region can be utilized directly for cooling the contact surface in that the latter is provided on the intake region. The ducts routed along the primary part to be cooled in turn discharge in an outlet region of the heat sink, from which the (now warmed) coolant is removed via a coolant outlet.

The intake region and the outlet region of the heat sink may be situated next to each other, but, e.g., without any physical contact between them. In other words, the intake and outlet regions of the heat sink may be set apart from each other. In addition, a material that does not conduct heat can be provided between the intake and outlet region of the heat sink in order to avoid an exchange of heat.

The intake and/or outlet region of the sink heat may be arranged as an elongated, hollow section, from which the ducts of the heat sink branch off (substantially transversely) or in which the ducts of the heat sink terminate (substantially transversely).

A plurality of ducts of the heat sink, which extend next to each other, may run along a coil shell of the primary part. This makes it possible to reduce the pressure drop along the ducts. In addition, the coolant flow may run in the opposite direction in adjacent ducts in order to minimize the temperature gradient in the heat sink.

To reduce the pressure drop along the flow direction of the coolant, the ducts and other regions of the heat sink may be arranged such that obstacles in the flow path as well as curves having small radii are avoided, if possible.

Additional features and advantages of example embodiments of the present invention are described in more detail below with reference to the Figures.

DETAILED DESCRIPTION

To illustrate the technical background of the exemplary embodiment described hereinafter with the aid of FIGS. 1 to 5D, FIG. 6 shows a cooling plate K, on which coils S1, S2, S3 and S1', S2', S3' of a primary part P of a linear motor are situated (on both sides, but this is not mandatory, it may otherwise also be situated on one side only). Flat coils S1, S2, S3, S1', S2', S3' are made up of a wire, e.g., copper wire, which is wound around a central opening of the individual coil. The winding of the coils may take place such that although many wires are situated next to each other in one plane, only one or few layer(s) of such windings is/are provided perpendicularly to the coil plane. Such a coil shape leads to a flat form of the primary part on the one hand, and allows a large-area contact with the likewise flat heat sink K in the form of a cooling plate, on the other.

Figure 6:
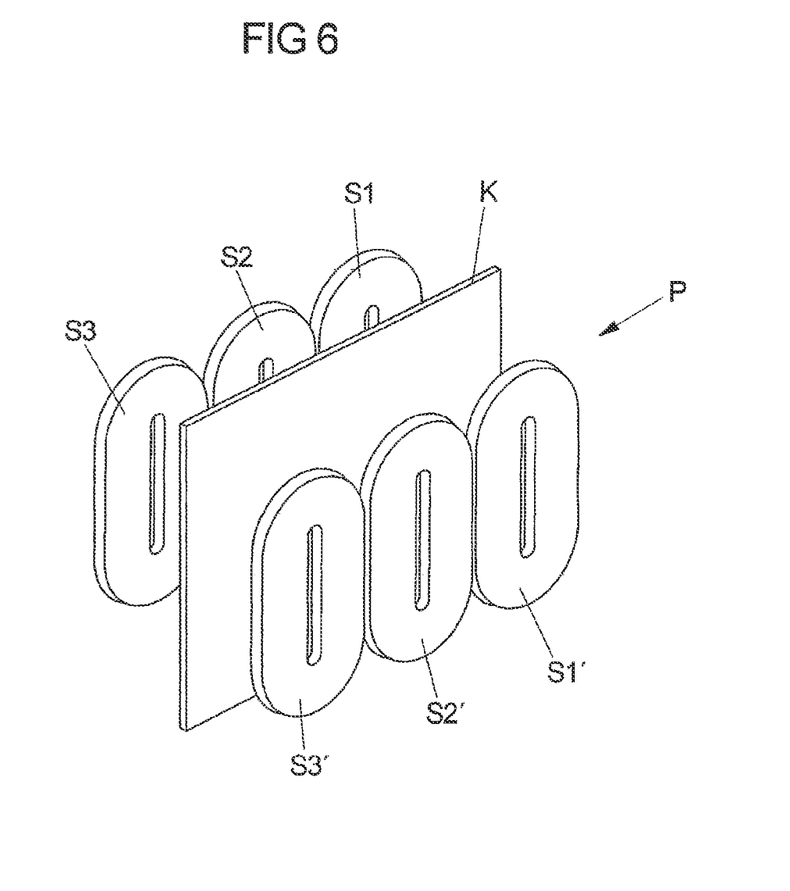
FIG. 6 is a schematic view of a system of a heat sink together with a coil system of a primary part of a linear motor.

The heat sink has coolant ducts in its interior, through which a coolant, especially in the form of a coolant fluid, flows when the corresponding motor is in operation, so that coils S1, S2, S3, S1', S2', S3' are cooled, i.e., in order to avoid especially excessive heating of the coils as a result of the current flowing through the coils when the motor is being operated. Since the primary part shown in FIG. 6 is an ironless primary part, heat sink K furthermore assumes the function of accommodating coils S1, S2, S3; S1', S2', S3.

In the following text, an example embodiment of a heat sink for an (ironless) primary part of a linear motor will be discussed in greater detail with reference to FIGS. 1 through 5B.

Figure 1A:
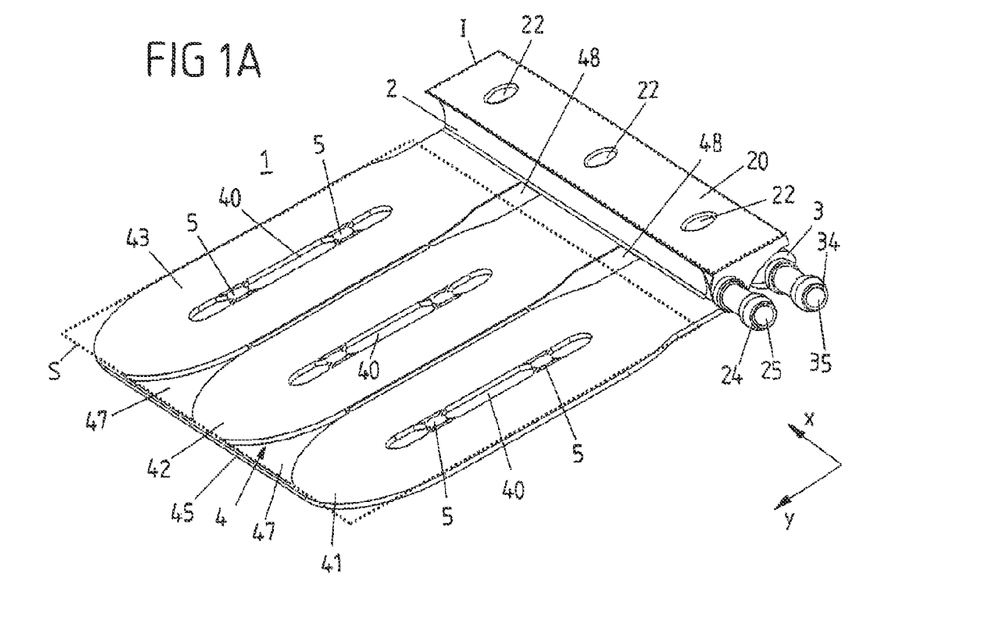
FIG. 1A is a first perspective illustration of a heat sink of a primary part of a linear motor.
Figure 1B:
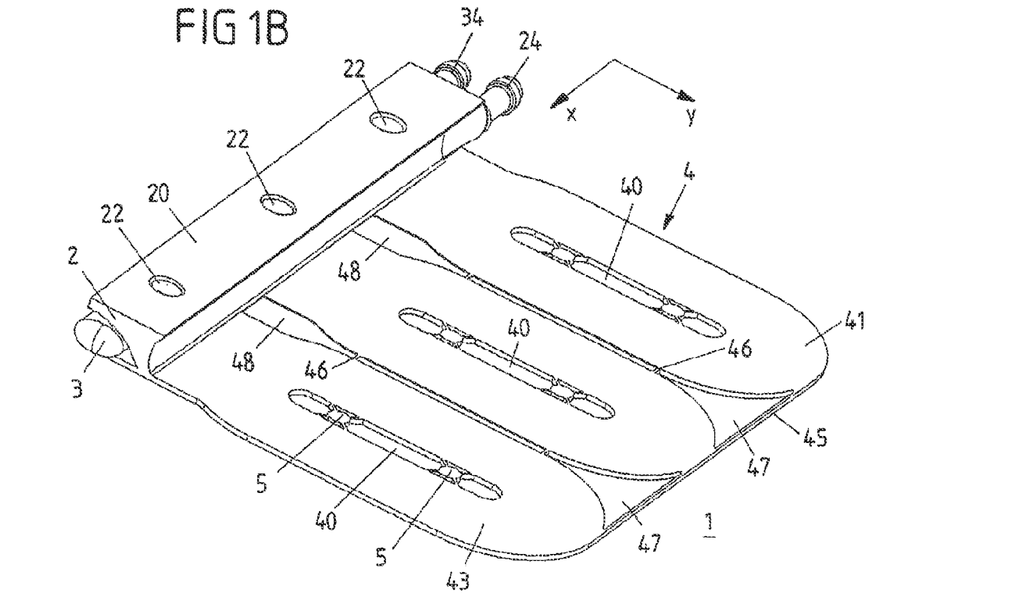
FIG. 1B is a second perspective illustration of the heat sink from FIG. 1A.

FIGS. 1A and 1B show two perspective views of a heat sink 1, which is used for cooling both coils S of a primary part of an (ironless) linear motor as well as an interface or contact area 20, via which heat sink 1 is in contact with the object to be moved by the linear motor, which thus is to be connected to the primary part, the object in particular being in the form of a machine component. Coil system S and interface I of the further object (via which the further object is resting against contact surface 20 on the primary part side) are indicated by dashed lines in FIG. 1A. As far as the possible structure of coil system S is concerned, reference is made to the previously discussed FIG. 6.

According to FIGS. 1A and 1B, heat sink 1 is a single, integrally formed component which is arranged and provided both for cooling coil system S and for cooling contact surface provided for contacting the object to be moved by the primary part.

A metal having excellent thermal conductivity while simultaneously featuring a relatively high specific electrical resistance, such as titanium, is a suitable material for heat sink 1. Sufficient thermal conductivity of the heat sink ensures that the heat generated during the operation of coil system S is dissipated, the heat being shunted into a coolant situated inside heat sink 1, and adequate specific resistance is counteracting the generation of eddy currents in heat sink 1.

3D printing, for instance, is especially suitable for the production of integrally formed heat sink 1, in particular from metal. An alternative option for the production, for example, is welding of at least two plate parts (plate halves), into which grooves have been introduced earlier (milled, for instance) in order to form ducts for the coolant.

Heat sink 1 once again has a cooling plate 4 as a central component, in order to minimize the height of the primary part on the one hand, and to provide contact with coil system S of the primary part across the largest surface possible, on the other.

Ducts for the coolant are provided within heat sink 6; they will be described in greater detail in the following text on the basis of FIG. 3 and serve as defined conduits for a coolant introduced into the heat sink, in particular in the form of a liquid coolant, both along contact surface 20 and along coil system S.

As illustrated FIGS. 1A and 1B, heat sink 1 has an intake region 2 provided with a coolant intake 25, and an outlet region 3 featuring a coolant outlet 35. Both coolant intake 25 and coolant outlet 35 are formed in one piece on heat sink 1 or, more precisely, in intake region 2 or outlet region 3 of heat sink 1. More specifically, intake 25 and outlet 35 are arranged as a passage in a connection region 24 or 34 integrally formed on the heat sink. Connection region 24 associated with intake 25 is used for connecting a supply line for a coolant, and connection 34 assigned to outlet 35 is used for connecting a discharge line for the coolant. Accordingly, first connection 25 is integrally molded in input region 2, and second connection 35 is integrally molded in outlet region 3 of heat sink 1.

Input region 2 extends (longitudinally) next to coil system S of the primary part. Projecting from it along the side are cooling loops 41, 42, 43 of heat sink 1, which are used for cooling the individual coils of coil system S and form a cooling plate 4 in the exemplary embodiment. Cooling loops 41, 42, 43 are situated next to each other in the plane of heat sink 1, i.e., in the xy plane defined by cooling plate 4.

Intake region 2, to which the coolant is supplied via intake of heat sink 1, is furthermore arranged such that it forms contact surface 20 for the placement of an object to be linked to the primary part and to be moved by it. In this manner, coolant admitted into intake region 2 of heat sink 1 can initially be used for cooling contact surface 20.

According to the exemplary embodiment, in this case input region 2 forms the (entire) primary-part side interface, via which the primary part is connected to the object. To do so, fastening points 22, in the form of fastening openings are provided on input region 25. They end at contact surface 20, via which heat sink 1 is resting against the object to be connected thereto, or its interface I.

Traveling from intake region 2, the coolant reaches laterally projecting cooling loops 41, 42, 43 of cooling region 4, against which the coils (see FIG. 6, for instance) of coil system S are resting (unilaterally or bilaterally).

Figure 3:
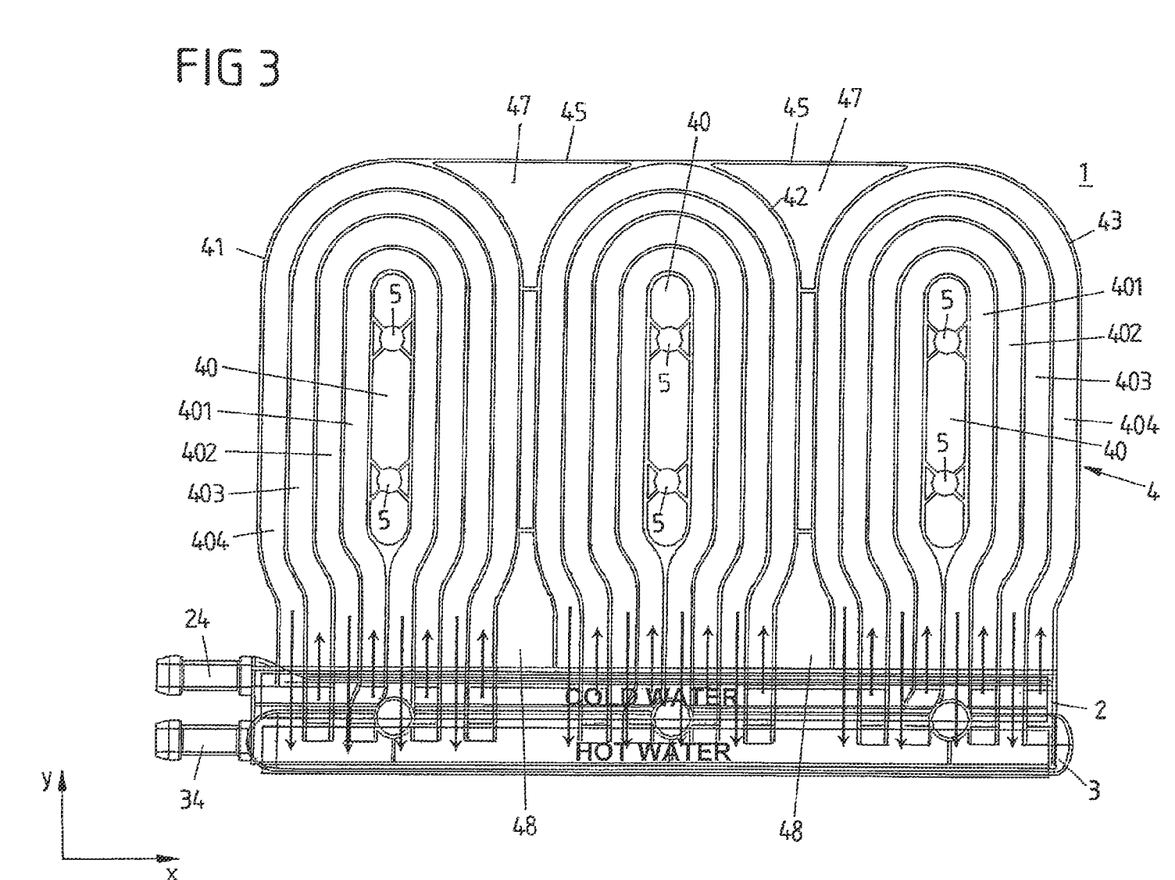
FIG. 3 is a plan view of the heat sink from FIGS. 1A and 1B with additionally indicated characteristics of ducts within the heat sink.

It is clear from an overall view of FIGS. 1A, 1B and 3 that a plurality of cooling loops 41, 42, 43 (in this instance, three) project from intake region 2 of heat sink 1, each having a planar configuration and enclosing an opening 40. Each cooling loop is provided for cooling an individual coil or two opposite-lying coils of the primary part, which are/is to be placed on the associated cooling loop 41, 42, 43.

Fastening elements 5, which will be described in greater detail on the basis of FIGS. 5A through 5D, are premolded on heat sink 1 or, more precisely, on cooling loops 41, 42, 43 (within the associated opening 40 there) in order to fix the coils in place on heat sink 1 or on an associated cooling loop 41, 42, 43. The fastening of the individual coils on heat sink 1 or the associated cooling loop 41, 42, 43 takes place, for example, with a certain contact pressure in order to optimize the heat transfer between the coil and the heat sink.

In the plan view according to FIG. 3, heat sink 1, especially its cooling region 4, is partially shown in transparent form, so that the ducts formed within the heat sink are visible. Accordingly, each cooling loop 41, 42, 43 forms multiple (four) ducts 401, 402, 403, 404, which surround central opening 40 of the individual cooling loop and are situated radially (from the inside to the outside, in relation to individual central opening 40) next to one another. Each duct 401, 402, 403, 404 branches off from intake region 2 of heat sink 1, then encloses central opening 40 of a cooling loop 41, 42, 43 and subsequently terminates in output region 3 of heat sink 1 in which coolant outlet 34 is provided.

When the heat sink shown in FIGS. 1A, 1B and 3 is in operation in order to cool a coil system S of the primary part of a linear motor and a contact surface 20 for contacting an object to be connected thereto, a supply line is connected to the one connection 24 of heat sink 1 on the input side, via which a coolant, in particular a liquid coolant, e.g., in the form of water, is supplied to heat sink 1 by intake 25 formed on intake-side connection 24. This coolant then flows into intake region 2 of heat sink 1, which extends along a first direction x in the exemplary embodiment. The coolant is used for cooling contact surface 20 already in the intake region. The direction along which the coolant supplied via intake 25 is flowing within intake region 2 along contact surface 20 is predefined by extension direction x of intake region 2.

From intake region 2, the coolant reaches cooling loops 41, 42, 43 that laterally project therefrom, more precisely, reaches individual ducts 401, 402, 403, 404, which are provided in cooling loops 41, 42, 43 in each case. The ducts branch off substantially perpendicularly (along a second direction y) from intake region 2 (extending along a first direction x). Extending next to each other within an individual cooling loop 41, 42, 43, as already described, they then enclose central opening 40 of individual cooling loop 41, 42, 43 and terminate, once again substantially perpendicularly (along second direction y), in outlet region 3 of heat sink 1. In the exemplary embodiment, the latter extends parallel to intake region 2 along first direction x.

Because multiple individual ducts 401, 402, 403, 404 are formed, which surround associated central opening 40 in an individual cooling loop 41, 42, 43, the pressure drop in the cooling loops is reduced.

Furthermore, according to FIG. 3, ducts 401, 402, 403, 404 of an individual cooling loop 41, 42, 43 are connected to the intake and outlet regions 2, 3 of heat sink 1 such that adjacent ducts 401, 402; 402, 403; 403, 404 are traversed by the coolant flow in the opposite direction in each case. This is indicated by arrows in FIG. 3, which show the flow direction of the coolant in the individual ducts. This minimizes the temperature gradient at the surface of heat sink 1 and achieves uniform cooling of the corresponding coil shell (S).

In discharge region 3, the coolant that emerges from cooling loops 41, 42, 43 or its ducts then flows along first direction x to outlet 35, where the coolant is able to be removed via an outlet line connected to corresponding connection 34. Outlet 35 is situated next to intake 25 on the front of heat sink 1, in accordance with the adjacent placement of intake region 2 of heat sink 1 on the one hand, and outlet region 3 on the other.

Figure 2:
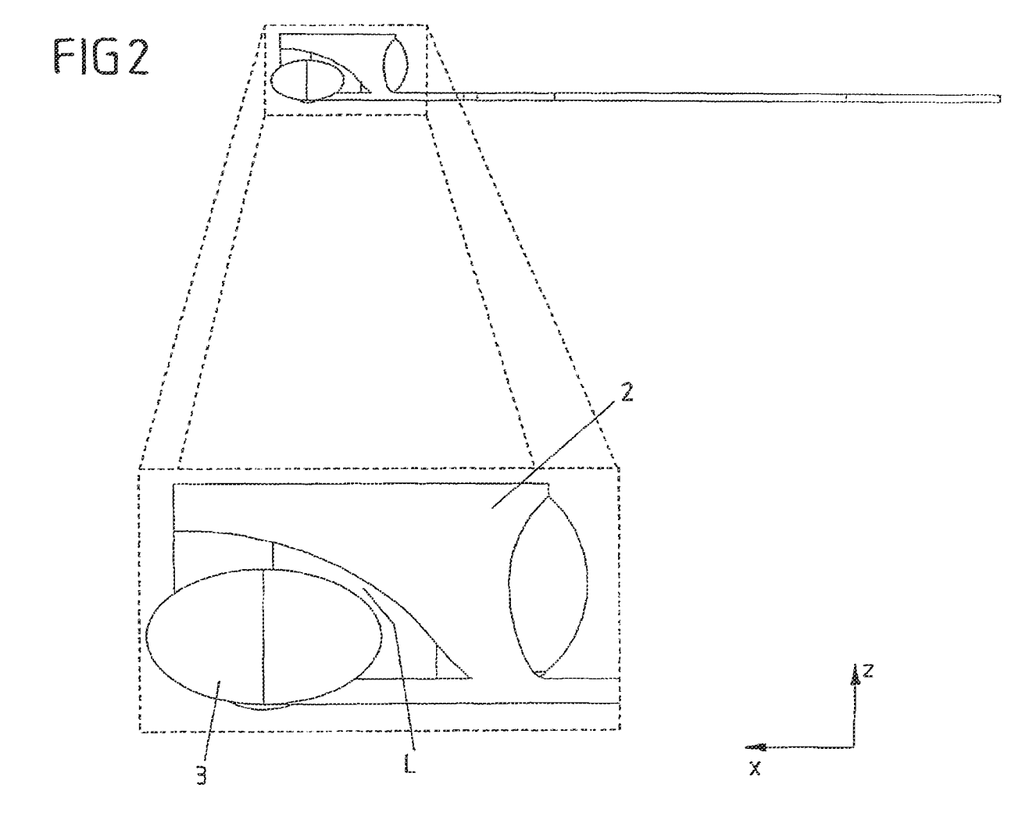
FIG. 2 is a front view of a subsection of the heat sink from FIGS. 1A and 1B.

As is clear in particular from the frontal view according to FIG. 2, intake and outlet region 2, 3 of heat sink 1 lie next to each other without being in contact with one another. Instead, a gap L exists between intake and outlet region 2, 3, which may additionally be filled with a material that does not conduct heat or conducts is poorly. This is meant to avoid a heat transfer between outlet region 3 and intake region 2 of heat sink 1. In particular, the coolant present in intake region 2 and to be used for the subsequent cooling is not to be heated by coolant coming from outlet region 3.

In summary, a coolant is introduced into heat sink 1 first via its intake 25 in intake region 2, where it is resting via contact surface 20, cooled by the coolant, at an object or its interface to be connected to the (ironless) primary part of the linear motor. From intake region 2, the coolant flows into ducts 401, 402, 403, 404 of cooling loops 41, 42, 43 which laterally project from the intake region, where the coolant is used for cooling coil system S of the primary part. Traveling from cooling loops 41, 42, 43, the coolant reaches outlet region 3 of heat sink 1, which extends next to intake region 2 (along a first direction x), but is set apart from intake region 2 (in plane yz perpendicular to first direction x). As a result, the coolant, which has warmed up previously, first in intake region 2 and then in cooling loops 41, 42, 43, does not make heat-conducting contact with the coolant present in intake region 2. The coolant finally exits outlet region 3 via outlet 35 provided there, which is situated next to intake 25 on the front side in the exemplary embodiment.

The flow paths in heat sink 1, in particular also ducts 401, 402, 403, 404 in heat sink 1, are arranged such that obstacles in the flow path of the coolant as well as curve characteristics featuring a large curvature (i.e., a small curvature radius) are avoided. This minimizes the pressure drop of the coolant along its flow route.

Figure 4:
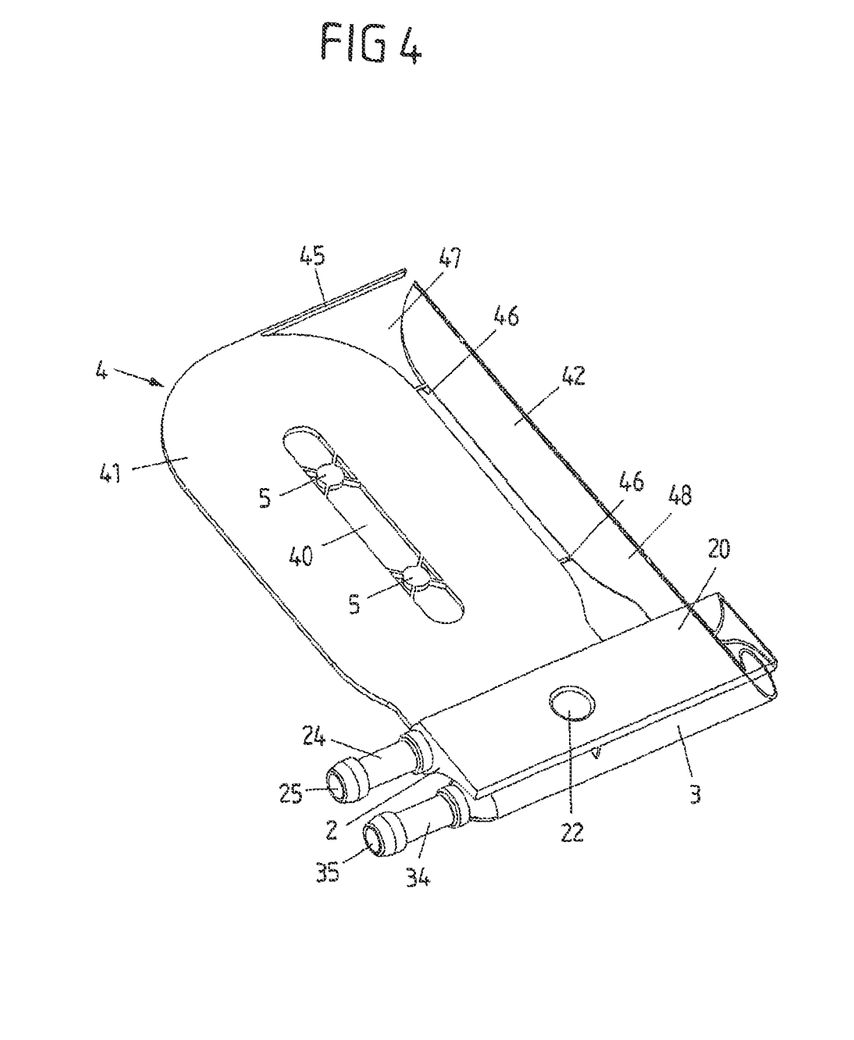
FIG. 4 is a cut-away view of the heat sink from FIGS. 1A and 1B.

FIG. 4 shows heat sink 1 from FIGS. 1A, 1B and 3 in the production by 3D printing. Here, as also in other production methods that are suitable for producing an integrally formed heat sink, the production costs are affected considerably also by the material cost. Heat sink 1 therefore has thin walls in order to reduce such costs. In addition, material is used only at the particular areas of the heat sink where it is actually necessary. Regions 47, 48 between individual cooling loops 41, 42, 43 remain free, for example, and cooling loops 41, 42, 43 are interconnected only via thin webs 45, 46. The radii on heat sink 1 or its components 2, 3, 4 are to be adapted to the production method selected in the individual case.

Since it is difficult in 3D printing to close hollow spaces by a wall that lies parallel to the printing plane, the corresponding walls may instead be arranged in curved shape, as illustrated in FIG. 4.

FIGS. 5A and 5B once again show a plan view and a side view of heat sink 1, but with a more detailed illustration of fastening elements 5 for fastening coils of a coil system on heat sink 1 or its cooling loops 41, 42, 43, the fastening elements being premolded in one piece on door element 1 or, more precisely, on an individual cooling loop 41, 42 or 43. Fastening elements 5 (illustrated in FIGS. 5C and 5D additionally in individual representations) are arranged as detent elements. They have elastic detent sections 52, here in the form of detent hooks, with the aid of which a latching connection with a coil shell is able to be established. For example, detent sections 52 may be used for engaging behind the edge of an opening in an individual coil shell.

Figure 5A:
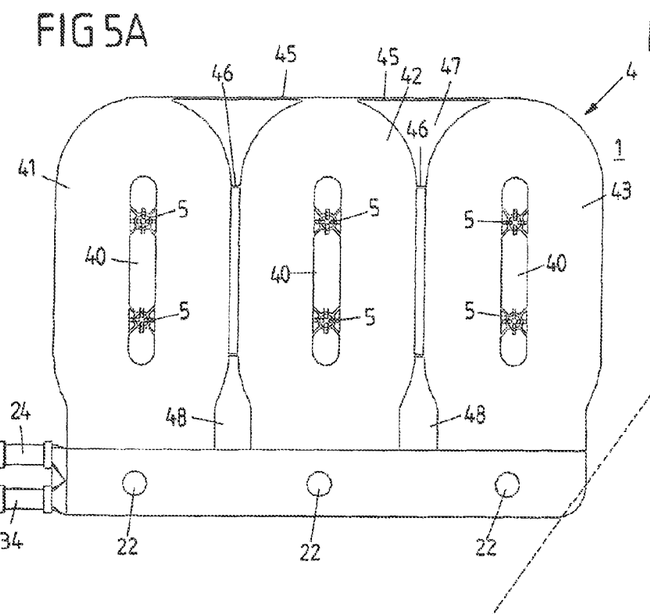
FIG. 5A is a further plan view of the heat sink from FIGS. 1A and 1B with a detailed depiction of fastening points provided on the heat sink.
Figure 5B:
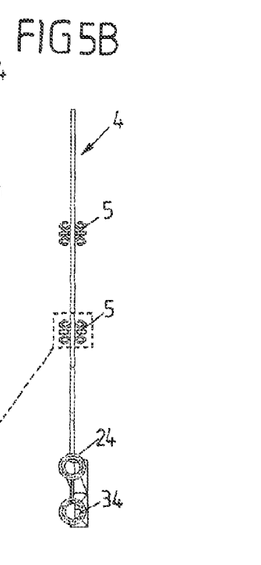
FIG. 5B is a side view of the heat sink from FIG. 5A.
Figure 5C:
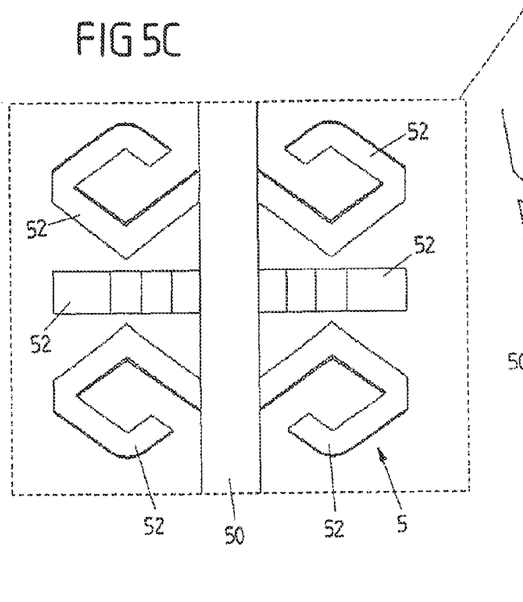
FIG. 5C is an enlarged cut-away portion of the heat sink from FIGS. 5A and 5B in the region of a fastening point.
Figure 5D:
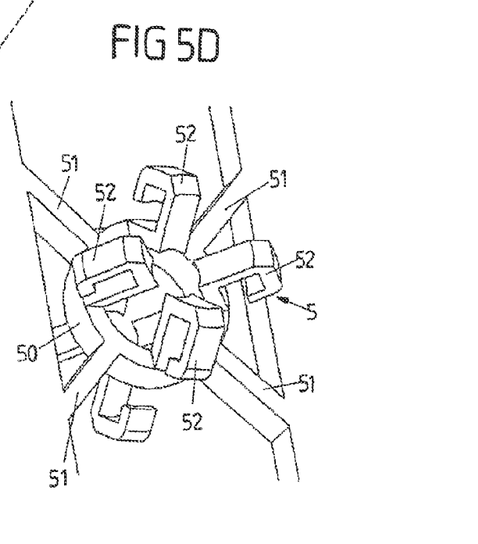
FIG. 5D is a perspective view of the fastening point from FIG. 5C.

In the case at hand, detent sections 52 project from a base body 50 of an individual fastening element 5; base body 50 is in turn integrally connected (via webs 51) to heat sink 1 or more precisely, to one cooling loop 41, 42, 43 of heat sink 1 in each case (in particular premolded thereon). Fastening elements 5 rest in central openings 40 of cooling loops 41, 42, 43.

The elastic detent elements may be used to generate a certain contact pressure of the coils of the primary part, to be fixed in place on heat sink 1, against heat sink 1 or more precisely, against cooling loops 41, 42, 43. This ensures an excellent heat transfer between the coil system and the heat sink.

Instead of the detent element illustrated, fastening openings (such as formed by base body 50, for instance) may be provided on heat sink 1 as fastening elements, on which a coil shell is able to be fixed in place with the aid of fastening bolts, e.g., in the form of a screw or a pin.

What is claimed is:

1. A heat sink for a primary part of a linear motor having a planar coil system that includes at least one coil energized when the motor is in operation, comprising:

at least one duct through which coolant flows during operation of the heat sink;
at least one inlet and at least one outlet for the coolant;
an interface adapted to connect to an object to be moved by the primary part, the interface having a contact surface adapted to contact the object; and
a flat cooling plate adapted to contact the coil system across a large surface area to cool the coil system;
wherein the heat sink is adapted to accommodate the coil system;
wherein the heat sink is arranged as an integrally formed component and is adapted to cool the coil system and the contact surface by the coolant supplied to the heat sink through the intake; and
wherein the heat sink configured such that coolant entering the heat sink is used first to cool the contact surface and then to cool the coil system.

2. The heat sink according to claim 1, wherein the heat sink is arranged as a single-piece, 3D printed component.

3. The heat sink according to claim 1, wherein the heat sink is formed of (a) a metal and/or (b) titanium.

4. The heat sink according to claim 1, wherein the heat sink includes a single intake and a single outlet.

5. The heat sink according to claim 1, further comprising a separated connection component premolded in one piece on the heat sink in a region of the intake and in a region of the outlet, the connection connectable to (a) a supply line for the coolant and/or (b) a discharge line for the coolant.

6. The heat sink according to claim 1, further comprising fastener components premolded on the heat sink adapted to attach to the coil system.

7. The heat sink according to claim 1, wherein the heat sink includes an intake region provided with an intake for the coolant, and includes an outlet region provided with an outlet for the coolant.

8. The heat sink according to claim 1, wherein the intake region and the outlet region extend longitudinally along one direction and are arranged at a distance from each other.

9. The heat sink according to claim 8, further comprising a material that (a) does not conduct heat and/or (b) conducts heat poorly is arranged between the intake region and the outlet region of the heat sink.

10. The heat sink according to claim 1, wherein the ducts of the heat sink form a plurality of cooling loops, each loop adapted to cool (a) one coil or (b) two coils arranged opposite each other on both sides of individual cooling loops, the ducts being connected to the intake region and outlet region of the heat sink such that a coolant introduced into the heat sink flows through adjacent ducts in opposite directions.

11. The heat sink according to claim 10, wherein the ducts branch off by a first end section substantially perpendicularly from the intake region of the heat sink and discharge with a second end section substantially perpendicularly into the outlet region of the heat sink.

12. The heat sink according to claim 1, wherein the ducts of the heat sink form a plurality of cooling loops, each loop adapted to cool (a) one coil or (b) two coils arranged opposite each other on both sides of individual cooling loops.

13. The heat sink according to claim 12, wherein the ducts branch off by a first end section substantially perpendicularly from the intake region of the heat sink and discharge with a second end section substantially perpendicularly into the outlet region of the heat sink.

14. A linear motor, comprising:
a primary part including a coil system having at least one coil electrically energizable during operation of the linear motor, an interface connectable to an object to be moved by the linear motor, and a heat sink according to claim 1 on which the coil system is fixed in place.

* * * * *